US012652402B2

(12) United States Patent
Panusopone et al.

(10) Patent No.: US 12,652,402 B2
(45) Date of Patent: *Jun. 9, 2026

(54) CONSTRAINED POSITION DEPENDENT INTRA PREDICTION COMBINATION (PDPC)

(71) Applicant: ARRIS Enterprises LLC, Horsham, PA (US)

(72) Inventors: Krit Panusopone, San Diego, CA (US); Seungwook Hong, San Diego, CA (US); Limin Wang, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,696

(22) Filed: Dec. 5, 2024

(65) Prior Publication Data

US 2025/0175627 A1    May 29, 2025

Related U.S. Application Data

(63) Continuation of application No. 18/431,877, filed on Feb. 2, 2024, now Pat. No. 12,200,232, which is a
(Continued)

(51) Int. Cl.
| | |
|---|---|
| *H04N 7/12* | (2006.01) |
| *H04N 19/105* | (2014.01) |
(Continued)

(52) U.S. Cl.
CPC ......... *H04N 19/197* (2014.11); *H04N 19/105* (2014.11); *H04N 19/11* (2014.11); *H04N 19/119* (2014.11); *H04N 19/12* (2014.11);

*H04N 19/159* (2014.11); *H04N 19/174* (2014.11); *H04N 19/176* (2014.11); *H04N 19/182* (2014.11); *H04N 19/186* (2014.11); *H04N 19/1883* (2014.11); *H04N 19/189* (2014.11); *H04N 19/593* (2014.11); (Continued)

(58) Field of Classification Search
CPC ............................ H04N 19/12; H04N 19/189
See application file for complete search history.

(56) References Cited

PUBLICATIONS

J. Chen, et al., "Algorithm Description of Joint Exploration Test Model 5 (JEM 5)", 5th JVET Meeting, Geneva, JVET-E1001-V2, Jan. 12-20, 2017, 44 pgs.

*Primary Examiner* — Y Lee
(74) *Attorney, Agent, or Firm* — Chernoff, Vilhauer, McClung & Stenzel, LLP

(57) ABSTRACT

A second level intra prediction mode can be combined with one or more of sixty-seven JVET intra prediction modes during encoding of a coding unit in a video bitstream. Embodiments include making a position dependent intra prediction combination (PDPC) mode available as the second level intra prediction mode. In embodiments, when a PDPC (position dependent intra prediction combination) mode is enabled, the second level intra prediction is combined with one of the 67 selected intra predictor modes. In embodiments, the PDPC mode is only enabled or available for a predetermined subset of intra prediction modes (out of 67 possible modes), in order to reduce encoder complexity and potentially improve coding efficiency. The PDPC mode may be identifies as enabled or available by a list of modes or signaling in the video bitstream.

3 Claims, 9 Drawing Sheets

Related U.S. Application Data continuation of application No. 18/126,315, filed on Mar. 24, 2023, now Pat. No. 11,936,858, which is a continuation of application No. 17/354,631, filed on Jun. 22, 2021, now Pat. No. 11,641,476, which is a continuation of application No. 16/867,275, filed on May 5, 2020, now Pat. No. 11,070,826, which is a continuation of application No. 15/849,629, filed on Dec. 20, 2017, now Pat. No. 10,674,165.

(60) Provisional application No. 62/477,329, filed on Mar. 27, 2017, provisional application No. 62/464,071, filed on Feb. 27, 2017, provisional application No. 62/446,034, filed on Jan. 13, 2017, provisional application No. 62/443,933, filed on Jan. 9, 2017, provisional application No. 62/441,729, filed on Jan. 3, 2017, provisional application No. 62/437,645, filed on Dec. 21, 2016.

(51) Int. Cl.

| | |
|---|---|
| *H04N 19/11* | (2014.01) |
| *H04N 19/119* | (2014.01) |
| *H04N 19/12* | (2014.01) |
| *H04N 19/159* | (2014.01) |
| *H04N 19/169* | (2014.01) |
| *H04N 19/174* | (2014.01) |
| *H04N 19/176* | (2014.01) |
| *H04N 19/182* | (2014.01) |
| *H04N 19/186* | (2014.01) |
| *H04N 19/189* | (2014.01) |
| *H04N 19/196* | (2014.01) |
| *H04N 19/593* | (2014.01) |
| *H04N 19/63* | (2014.01) |
| *H04N 19/64* | (2014.01) |
| *H04N 19/70* | (2014.01) |
| *H04N 19/82* | (2014.01) |
| *H04N 19/117* | (2014.01) |

(52) U.S. Cl.
CPC ........... *H04N 19/63* (2014.11); *H04N 19/647* (2014.11); *H04N 19/70* (2014.11); *H04N 19/82* (2014.11); *H04N 19/117* (2014.11)

CU
102

CU
102

CU
102

CU
102

CU
102

CU
102

CU
102

CU
102

CU
102

CU
102

CU
102

CU
102

CU
102

CU
102

CU
102

CU
102

CU
102

0: Planar
1: DC

800

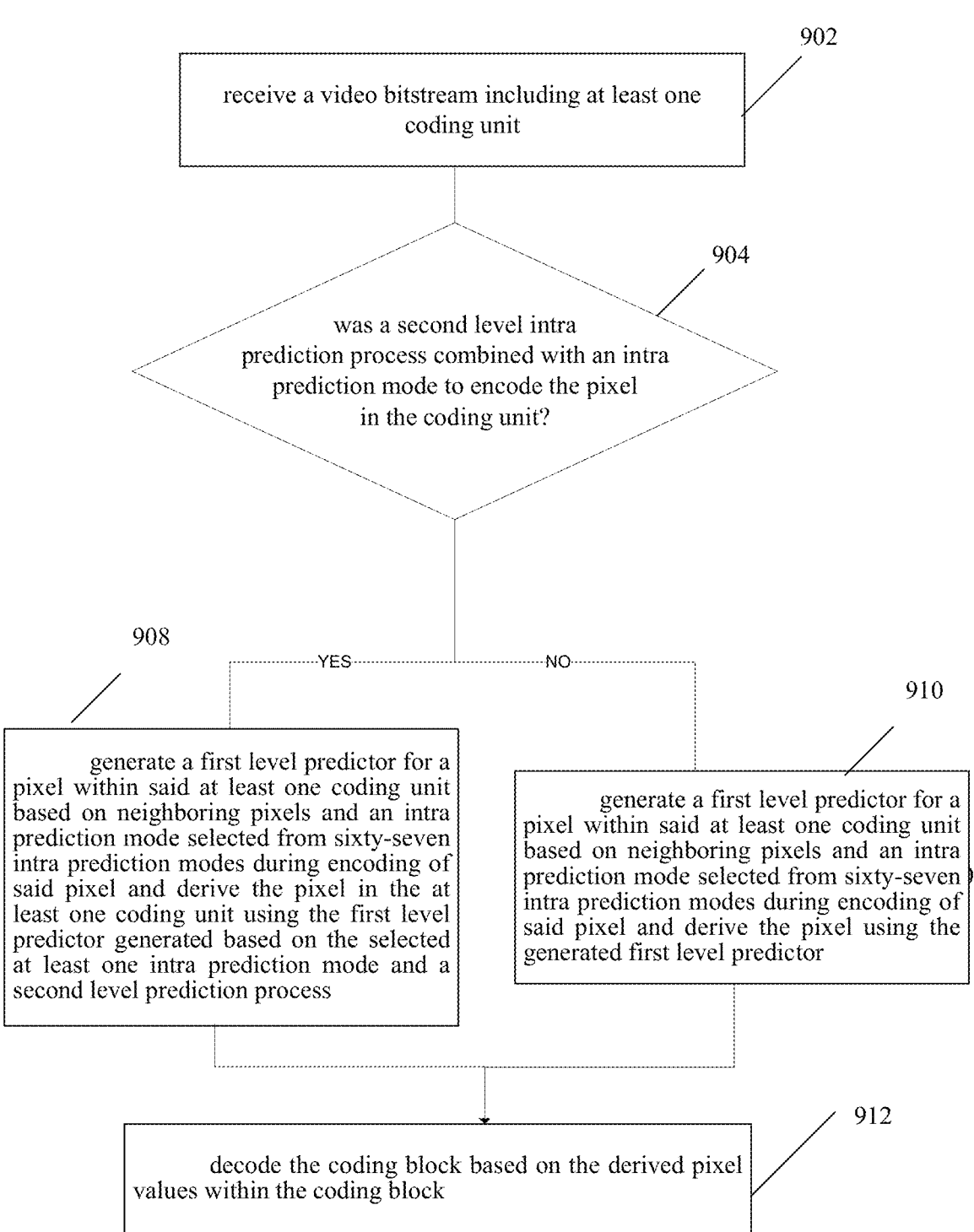

receive a video bitstream including at least one coding unit
902 was a second level intra prediction process combined with an intra prediction mode to encode the pixel in the coding unit?
904

908                                          YES                    NO generate a first level predictor for a pixel within said at least one coding unit based on neighboring pixels and an intra prediction mode selected from sixty-seven intra prediction modes during encoding of said pixel and derive the pixel in the at least one coding unit using the first level predictor generated based on the selected at least one intra prediction mode and a second level prediction process

910 generate a first level predictor for a pixel within said at least one coding unit based on neighboring pixels and an intra prediction mode selected from sixty-seven intra prediction modes during encoding of said pixel and derive the pixel using the generated first level predictor

912 decode the coding block based on the derived pixel values within the coding block

FIG. 9

CONSTRAINED POSITION DEPENDENT INTRA PREDICTION COMBINATION (PDPC)

CLAIM OF PRIORITY

This Application is a continuation of U.S. patent application Ser. No. 18/431,877 filed Feb. 2, 2024, which is a continuation of U.S. patent application Ser. No. 18/126,315, filed Mar. 24, 2023, now U.S. Pat. No. 11,936,858, which is a continuation of U.S. patent application Ser. No. 17/354, 631, filed Jun. 22, 2021, now U.S. Pat. No. 11,641,476, which is a continuation of U.S. patent application Ser. No. 16/867,275, filed May 5, 2020, now U.S. Pat. No. 11,070, 826, which is a continuation of U.S. patent application Ser. No. 15/849,629, filed Dec. 20, 2017, now U.S. Pat. No. 10,674,165, claims priority under 35 U.S.C. § 119(e) from earlier filed U.S. Provisional Application Ser. No. 62/437, 645, filed Dec. 21, 2016, from earlier filed U.S. Provisional Application Ser. No. 62/441,729, filed Jan. 3, 2017, from earlier filed U.S. Provisional Application Ser. No. 62/446, 034, filed Jan. 13, 2017, from earlier filed U.S. Provisional Application Ser. No. 62/464,071, filed Feb. 27, 2017, from earlier filed U.S. Provisional Application Ser. No. 62/477, 329, filed Mar. 27, 2017, and from earlier filed U.S. Provisional Application Ser. No. 62/443,933 filed Jan. 9, 2017, each of which is hereby incorporated by reference.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

The present disclosure provides a method of determining a pixel value for a pixel within a coding unit (CU) using one or more generated predictors. The method may include receiving a video bitstream including at least one coding unit. A first level predictor for a pixel within the coding unit may be generated based on neighboring pixels and an intra prediction mode selected from sixty-seven intra prediction modes during encoding of said pixel. If a second level intra prediction mode is determined to have been combined with the first level prediction mode during encoding, the pixel in the at least one coding unit may be decoded using the first level predictor generated based on the selected at least one intra prediction mode and a second level predictor generated based on the second level prediction mode, else decoding the prediction residual using the generated at least one intra prediction mode. A pixel value for the pixel may be determined using the one or more generated predictors. Determining whether a second level intra prediction mode is combined with the first level intra prediction mode may be determined based on a list of constrained intra prediction modes that are excluded from combination with the PDPC mode; and/or a presence or absence of signaling in the video bitstream identifying whether PDPC mode is applicable.

The present disclosure also provides an apparatus to predict a pixel value for a pixel within a coding unit using one or more generated predictors by way of the techniques disclosed herein.

BRIEF DESCRIPTION OF THE DRAWINGS

Further details of the present invention are explained with the help of the attached drawings in which:

FIG. 9 is a flow diagram that illustrates a method for performing the disclosed techniques.

DETAILED DESCRIPTION

Digital video involves a large amount of data representing each and every frame of a digital video sequence, or series of frames, in an uncompressed manner. Transmitting uncompressed digital video across computer networks is usually limited by bandwidth limitations, and usually requires a large amount of storage space. Encoding the digital video may reduce both storage and bandwidth requirements.

Frames of a video sequence, or more specifically the coding tree units within each frame, can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme.

Figure 1:
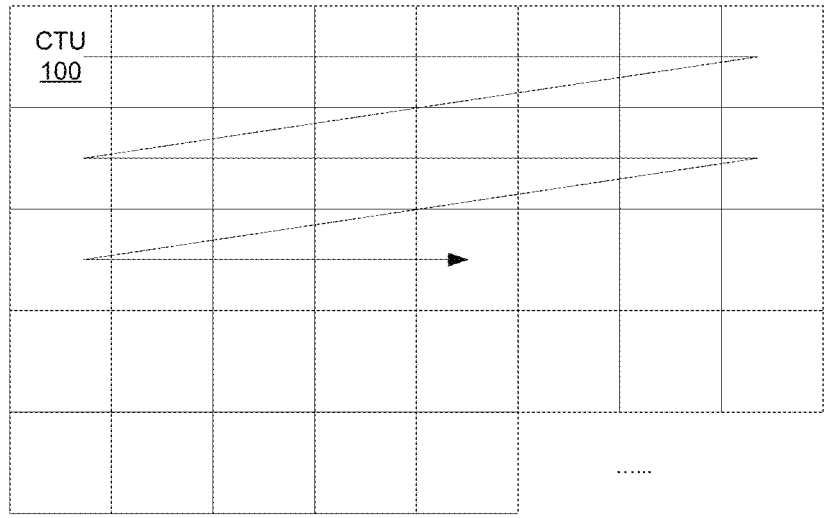
FIG. 1 depicts division of a frame into a plurality of Coding Tree Units (CTUs).

During coding with JVET, a frame is first divided into square blocks called Coding Tree Units (CTUs) 100, as shown in FIG. 1. FIG. 1 depicts division of a frame into a plurality of CTUs 100. For example, CTUs 100 can be blocks of 128×128 pixels. A frame can be an image in a video sequence, which may include a plurality of frames. A frame can include a matrix, or set of matrices, with pixel values representing intensity measures in the image. The pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Figures 2, 3:
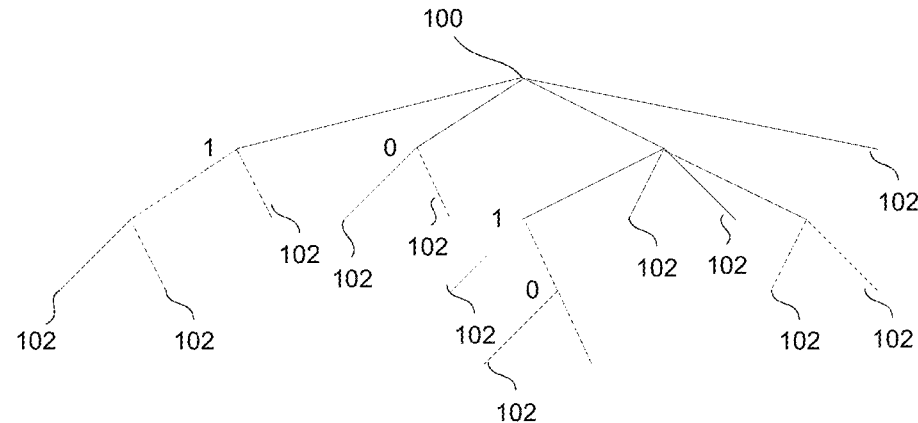
FIG. 2 depicts an exemplary partitioning of a CTU into Coding Units (CUs).
FIG. 3 depicts a quadtree plus binary tree (QTBT) representation of FIG. 2's CU partitioning.

FIG. 2 depicts an exemplary partitioning of a CTU 100 into CUs 102, which are the basic units of prediction in coding. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision in to CUs.

FIG. 3 shows a QTBT block structure representation of FIG. 2's partitioning. To generate an encoded representation of a picture or image, the video encoder may generate a set of CTUs. in FIG. 3, quadtree root node represents the CTU 100. To generate a coded CTU, the video encoder may recursively perform quadtree partitioning on the coding tree blocks of a CTU to divide the coding tree blocks into coding blocks (CB)s. Thus, as used herein, a video slice (e.g., a video frame or a portion of a video frame) may be partitioned into coding blocks, which may also be referred to as coding units, and each such coding unit may include blocks, such as luma blocks and chroma blocks, that are independently decoded. Thus, because JEM supports flexibility for CU partition shapes to better match local characteristics of video data, CUs may have non-square shapes and coding may take place at the CU level or at the luma or chroma block level within the CU. Reference is made herein to encoding or decoding a coding block, where a coding block represents a block of pixels that makes up a CU or coding blocks within the CU.

As shown in FIG. 3, each child node in a CTU 100 in the quadtree portion represents one of four square blocks split from a parent square block. The square blocks represented by the quadtree leaf nodes can then be divided zero or more times using binary trees, with the quadtree leaf nodes being root nodes of the binary trees, representing the parent coding unit that is partitioned into two child coding units. At each level of the binary tree portion, a block can be divided vertically or horizontally and symmetrically or asymmetrically. For example, a flag set to "0" may indicate that the block is symmetrically split horizontally, while a flag set to "1" may indicate that the block is symmetrically split vertically.

After quadtree splitting and binary tree splitting, the blocks represented by the QTBT's leaf nodes represent the final CUs 102 to be coded, such as coding using inter prediction or intra prediction. Inter-prediction exploits temporal redundancies between different frames. For example, temporally adjacent frames of video may include blocks of pixels that remain substantially the same. During encoding, a motion vector may interrelate movement of blocks of pixels in one frame to a block of correlating pixels in another frame. Thus, the system need not encode the block of pixels twice, but rather encode the block of pixels once and provide the motion vector to predict the correlated block of pixels.

For intra-prediction, a frame or portion of a frame may be encoded without reference to pixels in other frames. Instead, intra-prediction may exploit the spatial redundancies among blocks of pixels within a frame. For example, where spatially adjacent blocks of pixels have similar attributes, the coding process may reference a spatial correlation between adjacent blocks, exploiting the correlation by prediction of a target block based on prediction modes used in adjacent blocks.

For inter slices or slices or full frames coded with inter prediction, different partitioning structures can be used for luma and chroma components. For example, for an inter slice a CU 102 can have coding blocks for different color components, such as such as one luma CB and two chroma CBs. For intra slices or slices or full frames coded with intra prediction, the partitioning structure can be the same for luma and chroma components. Thus, each of the CTUs 100 may comprise a coding tree block of luma samples, corresponding coding tree blocks of chroma samples, and syntax structures used to code the samples of the coding tree blocks. A CTU may comprise a single coding tree block and the syntax structures used to code the samples. In either case, the CTU with coding blocks may be comprised within one or more coding units, as shown by FIG. 2 and FIG. 3.

Figure 4:
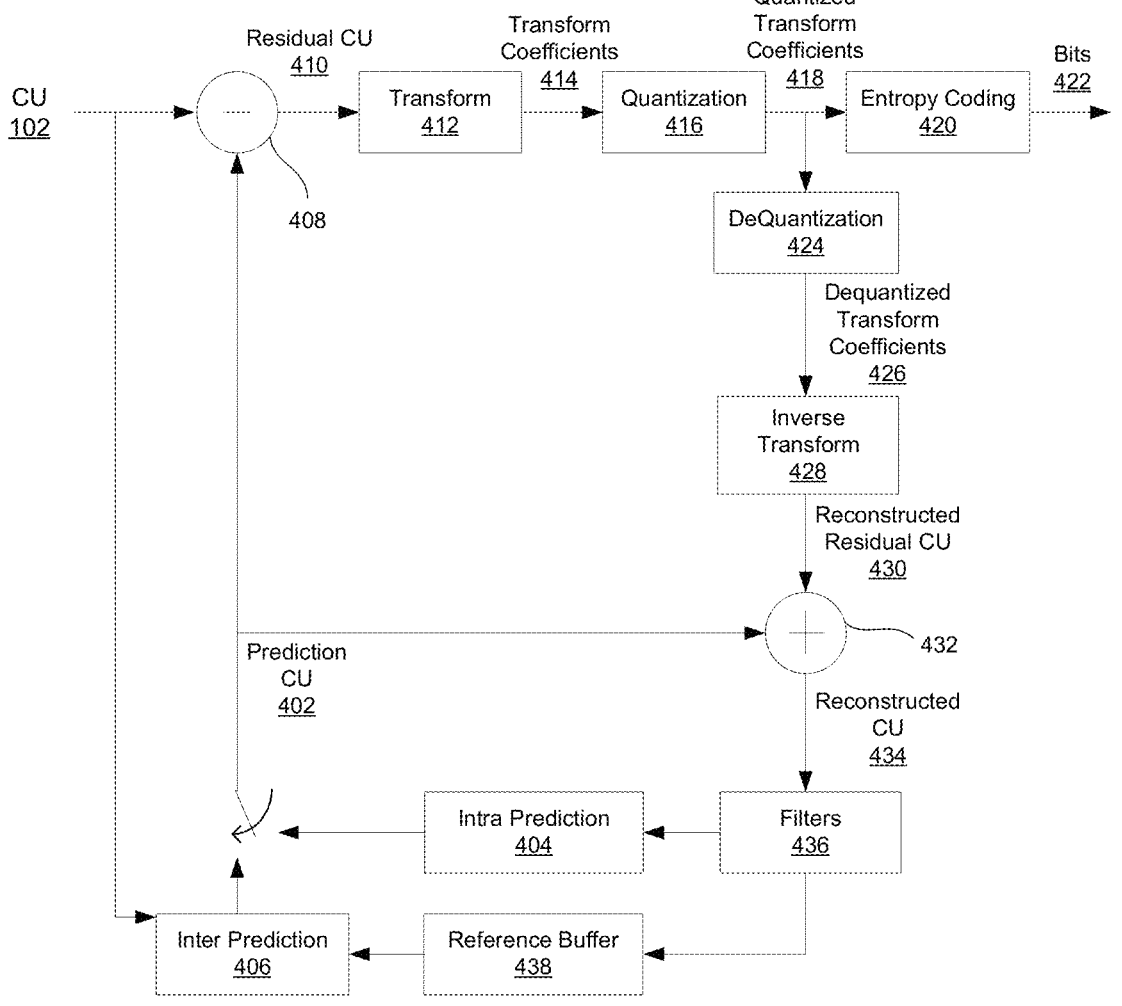
FIG. 4 depicts a simplified block diagram for CU coding in a JVET encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102 (e.g., a CU prior to encoding; e.g., the original CU to be encoded for transmission in the bitstream by generating a prediction CU) the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A sequence of coding units may make up a slice, and one or more slices may make up a picture. A slice may include one or more slice segments, each in its own NAL unit. A slice or slice segment may include header information for the slice or bitstream.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, the intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

When coding a CU's luma or chroma block components, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma block component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma block components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC)

process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at $\frac{1}{16}$ pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2(QP-4)/6$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET may utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below. In some embodiments the encoder can save overhead in the bitstream by omitting information from the bitstream that indicates which intra prediction modes were used to encode CUs 102, and the decoder can use template matching when decoding CUs 102 encoded with intra prediction.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed images or frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434. While in some embodiments the encoder can perform intra prediction at 404 as described above, in other embodiments the encoder can perform intra prediction template matching to generate a prediction CU 402 in the same way that a decoder would use template matching for intra prediction if information identifying the intra prediction mode used for the CU 102 is omitted from the bitstream.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
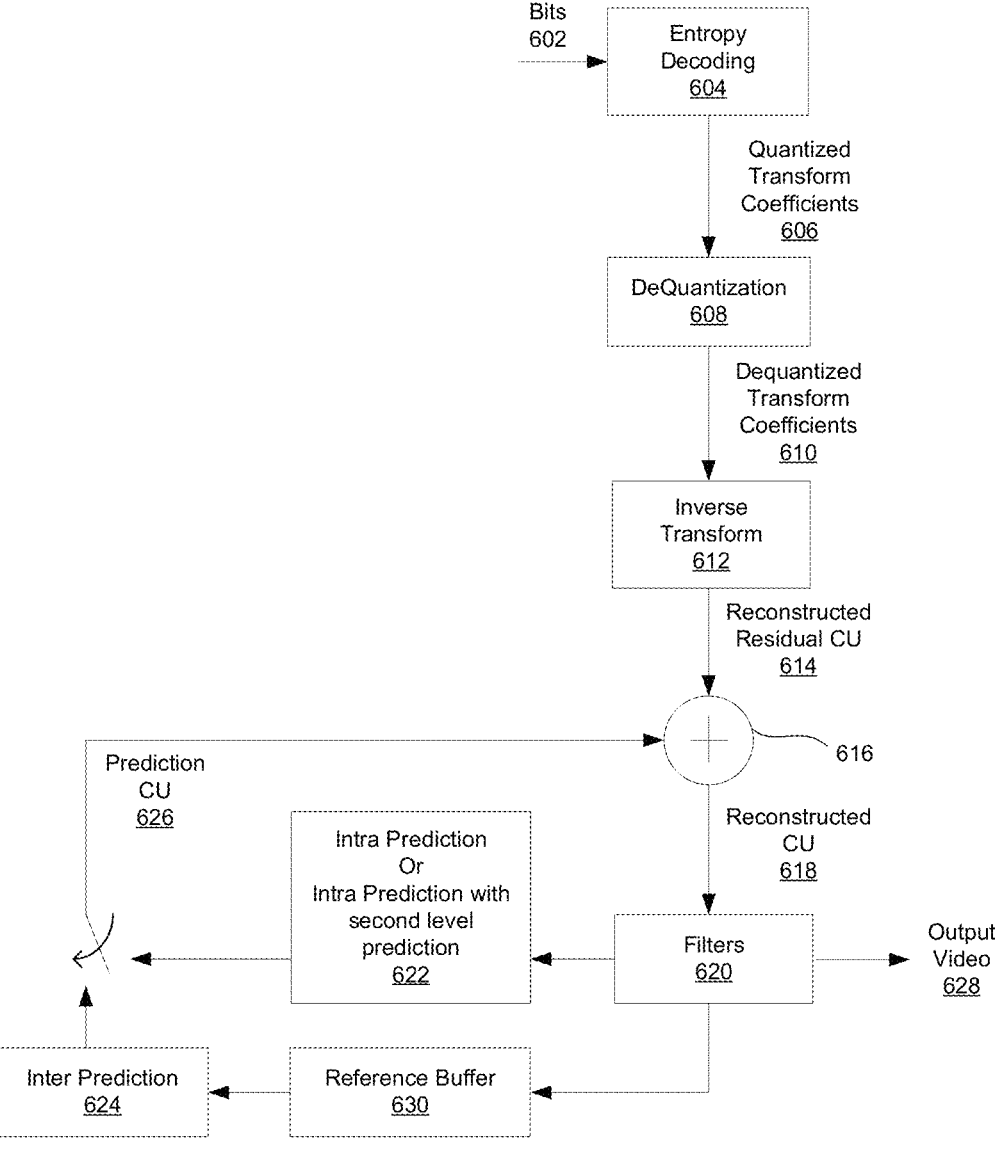
FIG. 6 depicts a simplified block diagram for CU coding in a JVET decoder.

FIG. 6 depicts a simplified block diagram for CU coding in a JVET decoder. A JVET decoder can receive a bitstream, or bits, 602 containing information about encoded video data. The encoded video data may represent partitioned luma blocks and partitioned chroma blocks, where the chroma blocks may be partitioned and coded independently of the luma blocks. The decoder may determine the respective coding mode respective to the blocks within each CU 102.

The bitstream can indicate how CUs 102 of a picture were partitioned from a CTU 100 according to a QTBT structure. The decoder may determine the tree structure as part of obtaining syntax elements from the bitstream. The tree structure may specify how the initial video block, such as a CTB, is partitioned into smaller video blocks, such as coding units.

As described herein, for each respective non-leaf node of the tree structure at each depth level of the tree structure, there are various splitting patterns for the respective non-leave node. By way of a non-limiting example, the bitstream can signal how CUs 102 were partitioned from each CTU 100 in a QTBT using quadtree partitioning, symmetric binary partitioning, and/or asymmetric binary partitioning. The video block corresponding to such respective non-leaf node may be partitioned into video blocks corresponding to the child nodes of the respective non-leaf node.

The bitstream can also indicate prediction information for the CUs 102 such as intra prediction modes or motion vectors. Bits 602 represent entropy encoded residual CUs. In some embodiments, syntax can be coded in the bitstream that indicates the intra prediction modes used to code each CU 102. In some embodiments, the encoder can have omitted information in the bitstream about intra prediction modes used to encode some or all CUs 102 coded using intra prediction, and as such the decoder can use template matching for intra prediction.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618. In embodiments disclosed in more detail below, the intra prediction at 622 may include preprocessing and/or post-processing steps, referred to herein as a second level prediction process. In some embodiments, the decoder can find the prediction CU 626 using template matching for intra prediction.

At 620, one or more filters can be applied to the reconstructed data, at a picture level or CU level, for example. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

In some embodiments the bitstream 602 received by a JVET decoder can include syntax identifying which intra prediction mode was used to encode a CU 102 with intra prediction, such that the decoder can directly use the signaled intra prediction mode at 622 to generate a prediction CU 626. In some embodiments such syntax can be omitted to save overhead by reducing the number of bits in the bitstream. In these embodiments, when the decoder is not provided with an indication of which intra prediction mode was used to encode a CU 102, the decoder can use template matching for intra prediction at 622 to derive the intra prediction mode it should use to generate a prediction CU 626. In some embodiments an encoder can similarly use template matching for intra prediction at 404 when generating a prediction CU 402 to combine with a reconstructed residual CU 430 at 432 within its decoding loop.

Figure 5:
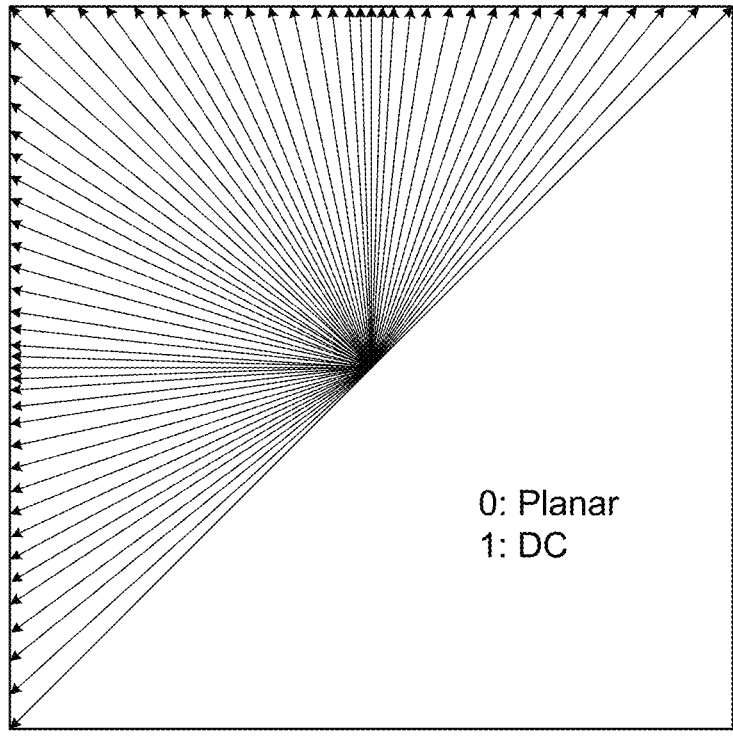
FIG. 5 depicts possible intra prediction modes for luma components in JVET.

As described herein, intra coding is a main tool for video compression. It utilizes the spatial neighbors of a pixel to create a predictor, from which a prediction residual between the pixel and its predictor is determined. A video encoder compresses the residuals, resulting in the coding bitstream. The developing video coding standard, JVET, allows 67 possible intra prediction modes, including planar mode, DC mode, and 65 angular direction modes, as shown in FIG. 5. Each intra prediction mode has a unique prediction generation method, based on either a left-side neighbor or a top-side neighbor.

Each intra coding block (CB) selects one or more intra prediction mode to be used, which may be signaled as overhead in bitstream. The decoder receives the video bitstream and identifies the prediction residual signaled in the bitstream. The decoder can determine which of the 67 possible intra prediction modes were used to compress the prediction residual, and decompress the prediction residual accordingly. The intra prediction mode may be identified on a coding unit or coding block level, where different pixels within the coding block may have been compressed using a different intra prediction mode. For example, pixels within the luma block in the coding unit may be compressed using a different intra prediction mode than the pixels within a chroma block in the coding unit. Using the prediction residual and a predictor created based on pixels neighboring the pixel within the CB during compression, the decoder can determine values for each pixel in the coding block.

Disclosed herein are various techniques for enabling a supplemental process applied to the intra prediction mode for improving accuracy of the predictions. As described in more detail below, a second level intra prediction process can be combined with one or more of the 67 selected intra prediction modes to further improve prediction accuracy. For example, proposed herein are one or more embodiments where the second level intra prediction process is a PDPC smoothing process. The disclosed techniques include identifying the PDPC process as available only for a predetermined subset of intra prediction modes (out of the 67 possible JVET modes), in order to reduce encoder complexity and potentially improve coding efficiency. In embodiments, when a PDPC (position dependent intra prediction combination) mode is enabled, the second level intra prediction process is combined with one of the 67 selected intra predictor modes. Such combination of the second level intra prediction process with one of the 67 selected intra predictor modes may further improve prediction accuracy.

As shown in block 622 in FIG. 6, in the position dependent intra prediction combination (PDPC) mode, a prediction block is generated by combining an intra predictor generated based on a first level prediction mode (e.g., a selected intra prediction mode) and a second level prediction process (e.g., PDPC). The first level predictor is generated for a pixel within a coding unit based on neighboring pixels and an intra prediction mode selected from the 67 available JVET intra prediction modes, as described above.

Figure 7A:
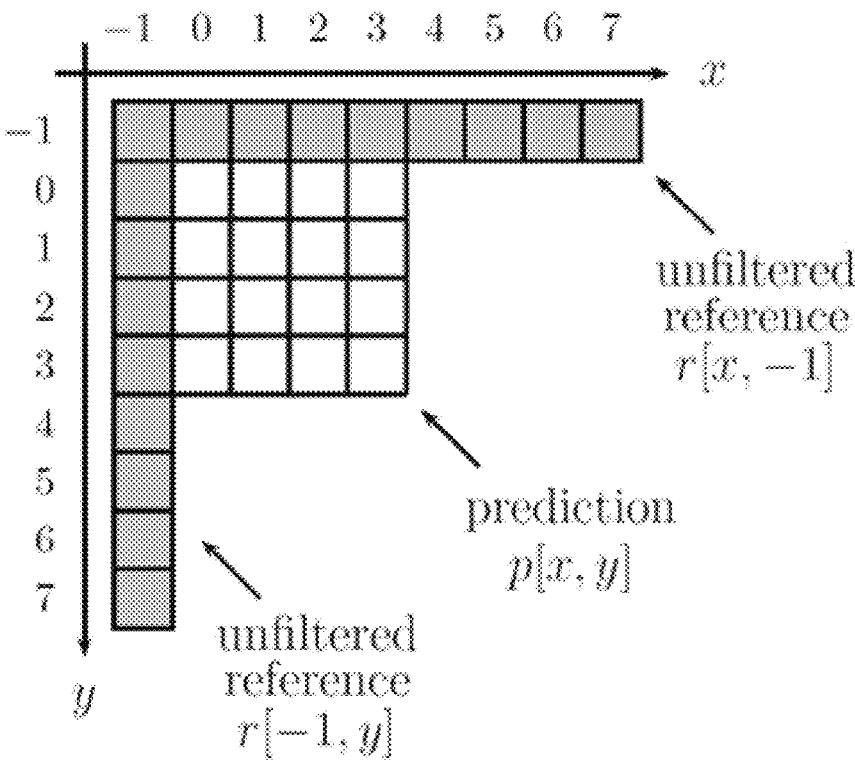
FIG. 7A depicts an embodiment of a position dependent intra prediction combination (PDPC) mode for a 4×4 CU in JVET, with notations for the unfiltered and filtered reference samples.
Figure 7B:
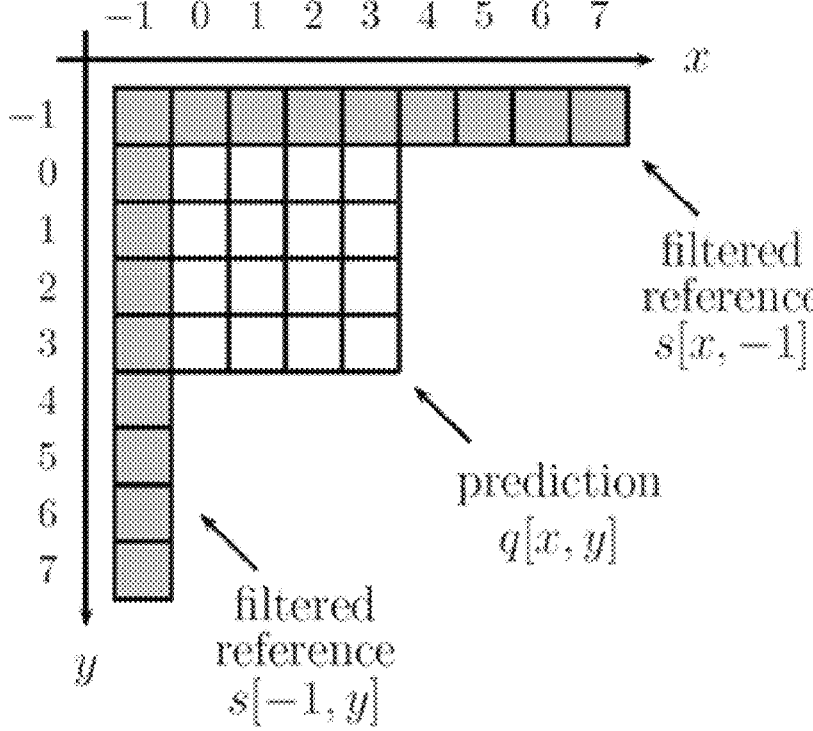
FIG. 7B depicts another embodiment of a position dependent intra prediction combination (PDPC) mode for a 4×4 CU in JVET, with notations for the unfiltered and filtered reference samples.

As described in more detail below, FIGS. 7A and 7B depict an example PDPC second level processing technique for intra prediction. It should be understood that the PDPC mode illustrated in FIGS. 7A and 7B are shown by way of example and are not meant to limit the PDPC mode to these examples. In this example, the PDPC mode invokes an intra prediction mode (e.g., first level predictor) with at least one boundary reference sample (e.g., second level prediction process). If the second level process is combined with the first level prediction mode to encode pixels in the coding unit, the decoder may be informed of such combination and proceed to decode the pixel in the at least one coding unit using the first level predictor generated based on the selected at least one intra prediction mode and a second level prediction process generated based on the second level prediction mode.

In embodiments, the second level prediction mode is a PDPC mode that enables a prediction scheme that combines filtered and non-filtered reference samples. Thus, PDPC may extend the available intra prediction modes by employing weighted combinations of filtered references and prediction samples calculated from unfiltered references, where the weights depend on prediction mode and pixel position. The PDPC mode is an example of the second level prediction process that smooths the prediction of the underlying intra prediction mode FIGS. 7A and 7B depicts an embodiment of a second level prediction process using PDPC for a 4×4 CU in JVET, with notations for the unfiltered and filtered reference samples. As shown, r represents boundary samples with filtered reference samples and s represents boundary samples with unfiltered reference samples. q[x,y] is the intra prediction based on filtered reference s, and computed as defined in JVET. X and y are the horizontal and vertical distance from the block boundary.

Equation (1) illustrates the computation when a first level predictor is combined with a second level prediction process to create the final predictor. The new prediction P[x,y], using ">>" to represent right bit-shift operation, combines weighted values of boundary elements with q[x·y]. In equation (1), r[x, y] denotes intensity of the reconstructed pixel at (x, y) coordinate, b[x, y] denotes a normalization factor for (x, y) coordinate, q[x, y] denotes the intensity value of the first level predictor pixel at (x, y) coordinate, $$c_v^1, c_v^2, c_h^1, c_h^2$$

are stored or predefined prediction weights, d is a dimension scale factor, and $\langle \bullet \rangle$ is a floor function. The prediction weights may be defined per intra prediction mode and coding unit size.

$$P[x, y] = \left\{ \left( c_1^v \gg \left( \frac{y}{d} \right) \right) r[x, -1] - \left( c_2^v \gg \left( \frac{y}{d} \right) \right) r[-1, -1] + \right. \tag{1}$$

-continued $$\left(c_1^h \gg \left(\frac{x}{d}\right)\right)r[-1, y] - \left(c_2^h \gg \left(\frac{x}{d}\right)\right)r[-1, -1] + b[x, y]q[x, y] + 64\right\} \gg 7$$

In JVET, the PDPC second level prediction process can be employed in combination with any of 67 possible intra prediction modes. However, combining the PDPC second level prediction process with any of the 67 possible intra prediction modes is not always ideal. First, an additional bin may be required for each luma CU to signal whether PDPC mode is used or not. Second, the complexity may increase due to a two-level prediction process if required by PDPC and the additional modes to be tested during the encoding decision process. Hence, in embodiments it may be beneficial to turn off PDPC mode for certain intra prediction modes. For example, when it is likely that PDPC mode will not improve coding performance enough for those intra prediction modes to compensate for the additional complexity, it may be desirable to disable the PDPC mode and/or not employ the combination of the second level pre- or post-processing technique with the intra prediction. As disclosed herein, techniques to constrain PDPC may include making the PDPC mode unavailable by disabling the mode or designating the second level prediction process as not applicable for certain intra prediction modes. A list of constrained intra prediction modes may be compiled, identifying the intra prediction modes where combination with a second level prediction process is excluded or not allowed. Such list of constrained intra prediction modes may be pre-determined.

A list of constrained intra modes, where PDPC is not allowed, may be pre-determined. Excluding PDPC for certain intra modes may affect the coding performance slightly, but it may lower the encoder complexity, and vice versa. The size of the constrained list may dictate coding performance and encoder complexity. One way to improve coding performance without employing PDPC for too many intra modes is to set the constrained list in adaptive manner such that the list excludes intra prediction modes that PDPC can most likely helps.

In embodiments, the intra prediction mode(s) is signaled before a second level prediction process (e.g., PDPC) flag in a bitstream. The second level prediction process described in more detail herein is the PDPC mode, however it should be understood that the second level prediction process may apply to a different second level processing process used in combination with the intra prediction mode to improve the prediction. Thus, as used herein, the PDPC mode is a specific example of a second level prediction process and is used interchangeably with a second level prediction process by way of example, but it should be understood that a different second level prediction process may apply. Thus, if the intra prediction mode selected for a coding block is in the list of the constrained modes, a PDPC flag will not be needed to enable PDPC or identify PDPC as applicable for that mode. Otherwise, a PDPC flag as described may be signaled to determine whether PDPC is used for the CU or not.

In embodiments where a flag in the bitstream signals whether PDPC mode is enabled or not enabled. The flag may indicate the predictor to be used and/or if the selected predictor can or should be combined with a second level predictor. For example, a flag may be signaled at the CU level or the coding block level to indicate whether PDPC mode is used or not. In embodiments, the flag may be disabled such that no flag is signaled in the bitstream to indicate that the first level predictor is used for prediction within a coding block without combination with a second level prediction process. In embodiments, a second level prediction process flag may be signaled for each of the luma coding block and the corresponding chroma coding blocks. In embodiments, when the flag is delivered, presence of the flag alone may indicate that the first level predictor is combined with the second level prediction process to create the final predictor, such as that according to equation (1).

Embodiments are described below that illustrate a manner for identifying the intra prediction modes that may be excluded from combination with a second level prediction process and/or the intra prediction modes that may be allowed in combination with the second level prediction process. The intra prediction modes that are not to be combined, with the second level prediction process, such as with PDPC, may be identified to the encoder or decoder, such as via signaling in the bitstream. In embodiments, where an intra prediction mode is identified as constrained, e.g., not to be combined with PDPC, signaling a PDPC flag may be avoided for those identified modes. In other words, if the intra prediction mode signaled is not accompanied by a PDPC flag, the decoder will identify this to mean that the intra prediction mode was not combined with the PDPC mode. In embodiments, the PDPC flag is signaled but identifies that the PDPC mode is disabled (or not enabled) for certain intra prediction modes. In embodiments, the PDPC flag is signaled but identifies whether the PDPC mode was used or not used in combination with the intra prediction mode. It should be understood that embodiments are described by way of example, and that different constrained modes may be identified as prohibited for combination with PDPC than those described.

In embodiments, Planar and DC mods are included in the list of constrained modes for PDPC. Thus, in embodiments for which the list of constrained modes identifies the intra prediction modes that are excluded from combination with PDPC, the list will serve to prevent or prohibit use of the PDPC mode for Planar and DC modes. As disclosed herein, the PDPC flag may be absent from the bitstream to indicate which modes are included in the list of constrained modes for PDPC. For example, the PDPC flag in which a planar intra prediction mode is used may be absent, thus indicating that for the current coding block the intra prediction process was not combined with a second level prediction process. In embodiments, the PDPC flag is signaled but identifies that the PDPC mode is disabled (or not enabled). In embodiments, the second level prediction process flag is signaled and identifies which second level prediction process was used In embodiments, all the intra modes except Horizontal, Vertical, Diagonal, and Off-Diagonal modes (i.e., modes 18, 50, 34, and 2) are included in the list of constrained modes for PDPC. Hence, such embodiments may include that the PDPC mode is only possible for Horizontal, Vertical, Diagonal, and Off-Diagonal modes. Further, such embodiments may be implemented such that the PDPC flag will be signaled only for Horizontal, Vertical, Diagonal, and Off-Diagonal modes. As described herein, the indication of whether PDPC mode is available or used may be accomplished via a flag, a list, or a combination of both.

In embodiments, all of the intra modes except Horizontal, Vertical, Diagonal, Off-Diagonal, Alternate Off-Diagonal modes (i.e., modes 18, 50, 34, 2 and 66) are included in the list of constrained modes for PDPC mode. Hence, such embodiment may include that the PDPC mode can only be possible for said Horizontal, Vertical, Diagonal, Off-Diagonal modes, and Alternate Off-Diagonal modes. Further, such embodiments may be implemented such that the PDPC flag will be signaled only for said Horizontal, Vertical, Diagonal, Off-Diagonal modes, and Alternate Off-Diagonal modes.

In embodiments, all the intra modes except Horizontal, Vertical, Diagonal, Off-Diagonal, DC modes (i.e., modes 18, 50, 34, 2 and 1) are included in the list of constrained modes for PDPC mode. Hence, such embodiment may include that the PDPC mode can only be possible for said Horizontal, Vertical, Diagonal, Off-Diagonal modes, and DC modes. Further, such embodiments may be implemented such that the PDPC flag will be signaled only for said Horizontal, Vertical, Diagonal, Off-Diagonal modes, and DC modes.

In embodiments, all the intra modes except Horizontal, Vertical, Diagonal, Off-Diagonal, Planar modes (i.e., modes 18, 50, 34, 2 and 0) are included in the list of constrained modes for PDPC mode. Hence, such embodiment may include that the PDPC mode can only be possible for said Horizontal, Vertical, Diagonal, Off-Diagonal, and Planar modes. Further, such embodiments may be implemented such that the PDPC flag will be signaled only for said Horizontal, Vertical, Diagonal, Off-Diagonal, and Planar modes.

In embodiments, all the intra modes except Horizontal, Vertical, Diagonal, Off-Diagonal, DC, Planar modes (i.e., modes 18, 50, 34, 2, 1 and 0) are included in the list of constrained modes for PDPC mode. Hence, such embodiment may include that the PDPC mode can only be possible for said Horizontal, Vertical, Diagonal, Off-Diagonal, DC, and Planar modes. Further, such embodiments may be implemented such that the PDPC flag will be signaled only for said Horizontal, Vertical, Diagonal, Off-Diagonal, DC, and Planar modes.

In embodiments, all the intra modes except Horizontal, Vertical, Diagonal, Off-Diagonal, Alternate Off-Diagonal, DC modes (i.e., modes 18, 50, 34, 2, 66 and 1) in the list of constrained modes for PDPC mode. Hence, such embodiment may include that the PDPC mode can only be possible for said Horizontal, Vertical, Diagonal, Off-Diagonal, Alternate Off-Diagonal, and DC modes, and the PDPC flag will be signaled only for said Horizontal, Vertical, Diagonal, Off-Diagonal, Alternate Off-Diagonal, and DC modes.

In embodiments, all the intra modes except Horizontal, Vertical, Diagonal, Off-Diagonal, Alternate Off-Diagonal, DC, Planar modes (i.e., modes 18, 50, 34, 2, 66, 1 and 0) are included in the list of constrained modes for PDPC mode. Hence, such embodiment may include that the PDPC mode can only be possible for said Horizontal, Vertical, Diagonal, Off-Diagonal, Alternate Off-Diagonal, DC, and Planar modes, and the PDPC flag will be signaled only for said Horizontal, Vertical, Diagonal, Off-Diagonal, Alternate Off-Diagonal, DC, and Planar modes.

In embodiments, all the intra modes except Off-Diagonal, Horizontal, and Vertical, modes (i.e., modes 2, 18, and 50) are included in the list of constrained modes for PDPC. Hence, such embodiment may include that the PDPC mode can only be possible for said Off-Diagonal, Horizontal, and Vertical modes, and the PDPC flag will be signaled only for said Horizontal, Vertical, and Off-Diagonal modes.

In embodiments, all the intra modes except Horizontal, Vertical, and Diagonal modes (i.e., modes 18, 50, and 34) are included in the list of constrained modes for PDPC. Hence, such embodiment may include that the PDPC mode can only be possible for said Horizontal, Vertical, and Diagonal modes, and the PDPC flag will be signaled only for said Horizontal, Vertical, and Diagonal modes.

In embodiments, all the intra modes except Horizontal, Vertical, and DC modes (i.e., modes 18, 50, and 1) are included in the list of constrained modes for PDPC. Hence, such embodiment may include that the PDPC mode can only be possible for said Horizontal, Vertical, and DC modes, and the PDPC flag will be signaled only for said Horizontal, Vertical, and DC modes. In embodiments, all the intra modes except Horizontal, and Vertical, modes (i.e., modes 18, and 50) are included in the list of constrained modes for PDPC. Hence, such embodiment may include that the PDPC mode can only be possible for said Horizontal, and Vertical modes, and the PDPC flag will be signaled only for said Horizontal, and Vertical modes.

It may be a complex task to generate an adaptive constrained list with a goal of maximizing coding efficiency for a current CU or coding block. Embodiments are disclosed that consider a balance of coding efficiency versus complexity in adaptive constrained list construction. In JVET intra mode coding, embodiments are disclosed that rely on a most probable mode (MPM) to classify the intra prediction modes that are most likely to be chosen for a current CU or coding block. This makes the MPM candidate list a good choice for the adaptive constrained list (i.e., modes in the MPM list are excluded from the constrained list). Specifically, in embodiments, PDPC is only applicable for intra prediction modes in the MPM candidate list for a current coding block, making the PDPC flag existence conditional on the MPM flag. In other words, in embodiments the MPM flag would appear before the PDPC flag in bitstream. In such embodiments, if the MPM flag indicates that MPM modes is used, then the PDPC flag is signaled to indicate whether PDPC option is used for the selected intra prediction mode or not, otherwise, the PDPC flag is skipped for the current CU.

In implementations of JVET, the status of PDPC mode for chroma CU is derived from the PDPC flag of its corresponding luma CU. In implementations, the PDPC flag may only be signaled for luma CU and the status of PDPC mode for chroma CU must be derived from the PDPC flag of its corresponding luma CU. Thus, in embodiments disclosed herein, Consideration may be required for chroma CU when the PDPC mode is constrained. Disclosed herein are proposals for considering chroma CU.

In embodiments for coding the chroma coding block, if a chroma coding block selects an intra prediction mode in the constrained list, the PDPC flag of its corresponding luma coding block may be disregarded even if signaled, and instead the chroma coding block may use the intra predictor generated based on the selected intra prediction mode. For example, the chroma coding block may select the intra predictor that corresponds only to the selected intra prediction mode. In embodiments for coding the chroma coding block, if the PDPC flag of a luma coding block is not present (i.e., its corresponding luma coding block using intra prediction mode is in the constrained list and a PDPC flag is not signaled or is signaled but indicates the second level prediction process is not applicable), the corresponding chroma coding block may use the intra predictor generated based on the selected intra prediction mode. For example, the chroma coding block may select the intra predictor that corresponds only to the selected intra prediction mode.

In embodiments, requirements for coding efficiency may be more important than complexity and PDPC mode may be useful for all intra prediction modes. Thus, embodiments are contemplated for signaling whether constrained PDPC is used or not. The signaling may be possible via explicit or implicit means. For example, a new flag may be included at a SPS, PPS, or slice header level to indicate whether constrained PDPC is used for that sequence, picture, slice, respectively, or not. In embodiments, if the new flag is negative or 1, then the constrained PDPC option is disabled and the PDPC mode is allowed for all 67 intra modes. Otherwise, constrained PDPC option is enabled and PDPC mode is allowed for intra modes that are not in the constrained list (i.e., PDPC flag is signaled for the allowed intra modes). In embodiments, the constrained PDPC is allowed for only certain slice types, such as P and B slices, while allowing full PDPC mode for other slice types (i.e., I slices)

The PDPC implementation in the JVET reference software is computational intensive. It first determines N intra modes with the lowest SAD between pixels in predictor and original blocks. The selected N modes are then processed with transform, quantization, and coefficient coding processes to determine full RD cost (bits used to compress a coding block with a testing mode and a pixel distortion between reconstructed and original blocks). The intra mode with the lowest full RD cost is selected for the PDPC option.

As disclosed herein, lower encoder complexity can be achieved with constrained PDPC, implementing techniques disclosed herein. For example, in embodiments with a limited number of allowable modes for PDPC, constrained PDPC mode decision can be done efficiently by only performing full RD search on the limited number of allowable modes. To minimize modification to JVET reference software, it is preferable to employ different number of modes (N), one for each block size, for full RD search process in constrained PDPC.

Another benefit of constrained PDPC as disclosed herein is that it may allow for smaller table to store PDPC weights. In the current JVET, a 3D table with dimension [x][y][z], with x=5, y=35, z=6, where the second dimension (y) corresponding to intra mode index, as shown in Table 1, is employed for PDPC operations. In embodiments for which a smaller number of PDPC modes are allowed, entries that are constrained can be removed with no impact on coding efficiency. For example, in an embodiment described above for which only 4 modes use PDPC; i.e., Horizontal, Vertical, Diagonal, and Off-Diagonal modes (all other modes may be excluded or prohibited from using PDPC). Hence, the 3D table to support such constraint can be reduced to become [5][4][6], such as an example shown in Table 2. In this example, Horizontal mode (mode 18) employs weights listed in entries [x][1][z] in weighted table, Vertical mode (mode 50) employs weights listed in entries [x][3][z], Diagonal mode (mode 34) employs weights listed in entries [x][2][z], Off-Diagonal mode (mode 2) employs weights listed in entries [x][0][z]. Similar modification to PDPC table can be employed with different constrained list, example of which are provided herein.

Figure 8:
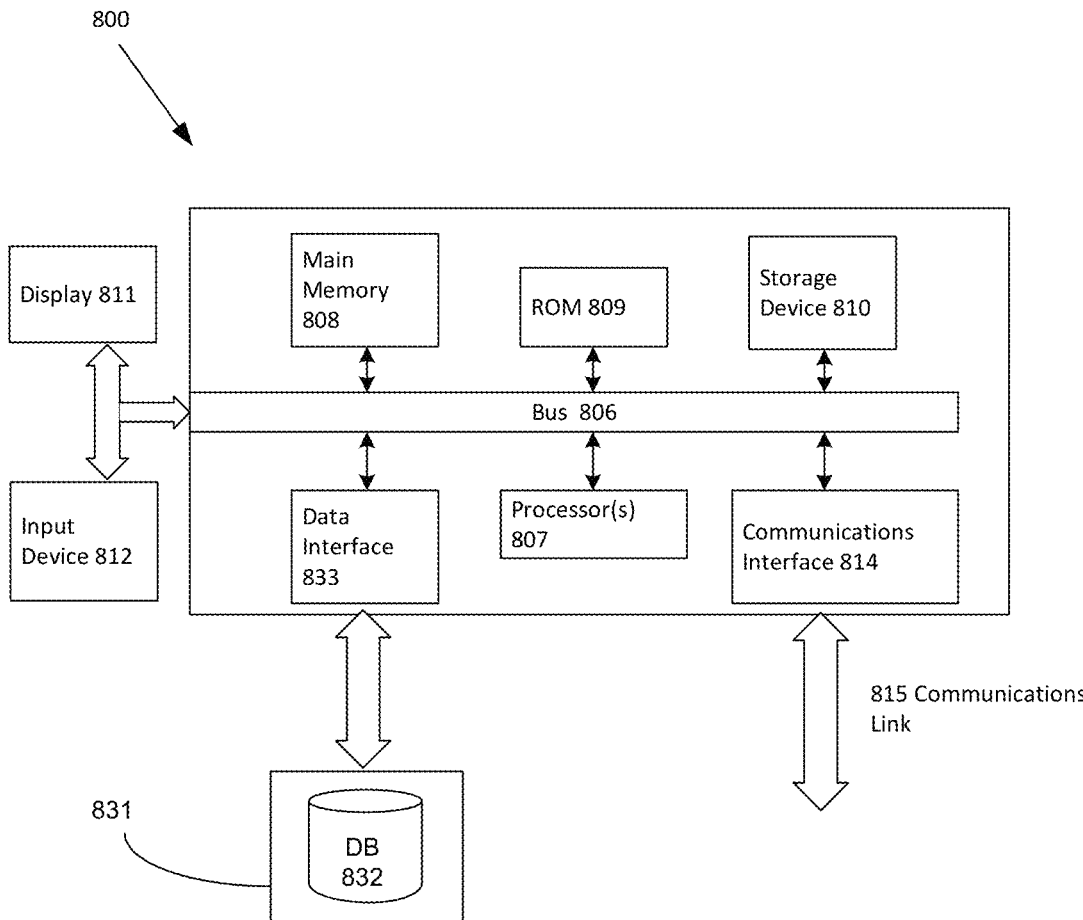
FIG. 8 depicts an embodiment of a computer system adapted and/or configured to process a method of CU coding.

The execution of the sequences of instructions required to practice the embodiments can be performed by a computer system 800 as shown in FIG. 8. In an embodiment, execution of the sequences of instructions is performed by a single computer system 800. According to other embodiments, two or more computer systems 800 coupled by a communication link 815 can perform the sequence of instructions in coordination with one another. Although a description of only one computer system 800 will be presented below, however, it should be understood that any number of computer systems 800 can be employed to practice the embodiments.

A computer system 800 according to an embodiment will now be described with reference to FIG. 8, which is a block diagram of the functional components of a computer system 800. As used herein, the term computer system 800 is broadly used to describe any computing device that can store and independently run one or more programs.

Each computer system 800 can include a communication interface 814 coupled to the bus 806. The communication interface 814 provides two-way communication between computer systems 800. The communication interface 814 of a respective computer system 800 transmits and receives electrical, electromagnetic or optical signals, which include data streams representing various types of signal information, e.g., instructions, messages and data. A communication link 815 links one computer system 800 with another computer system 800. For example, the communication link 815 can be a LAN, in which case the communication interface 814 can be a LAN card, or the communication link 815 can be a PSTN, in which case the communication interface 814 can be an integrated services digital network (ISDN) card or a modem, or the communication link 815 can be the Internet, in which case the communication interface 814 can be a dial-up, cable or wireless modem.

A computer system 800 can transmit and receive messages, data, and instructions, including program, i.e., application, code, through its respective communication link 815 and communication interface 814. Received program code can be executed by the respective processor(s) 807 as it is received, and/or stored in the storage device 810, or other associated non-volatile media, for later execution.

In an embodiment, the computer system 800 operates in conjunction with a data storage system 831, e.g., a data storage system 831 that contains a database 832 that is readily accessible by the computer system 800. The computer system 800 communicates with the data storage system 831 through a data interface 833. A data interface 833, which is coupled to the bus 806, transmits and receives electrical, electromagnetic or optical signals, which include data streams representing various types of signal information, e.g., instructions, messages and data. In embodiments, the functions of the data interface 833 can be performed by the communication interface 814.

Computer system 800 includes a bus 806 or other communication mechanism for communicating instructions, messages and data, collectively, information, and one or more processors 807 coupled with the bus 806 for processing information. Computer system 800 also includes a main memory 808, such as a random-access memory (RAM) or other dynamic storage device, coupled to the bus 806 for storing dynamic data and instructions to be executed by the processor(s) 807. The main memory 808 also can be used for storing temporary data, i.e., variables, or other intermediate information during execution of instructions by the processor(s) 807.

The computer system 800 can further include a read only memory (ROM) 809 or other static storage device coupled to the bus 806 for storing static data and instructions for the processor(s) 807. A storage device 810, such as a magnetic disk or optical disk, can also be provided and coupled to the bus 806 for storing data and instructions for the processor(s) 807.

A computer system 800 can be coupled via the bus 806 to a display device 811, such as, but not limited to, a cathode ray tube (CRT) or a liquid-crystal display (LCD) monitor, for displaying information to a user. An input device 812, e.g., alphanumeric and other keys, is coupled to the bus 806 for communicating information and command selections to the processor(s) 807.

According to one embodiment, an individual computer system 800 performs specific operations by their respective processor(s) 807 executing one or more sequences of one or more instructions contained in the main memory 808. Such instructions can be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 807. Such a medium can take many forms, including, but not limited to, non-volatile, volatile and transmission media. Non-volatile media, i.e., media that can retain information in the absence of power, includes the ROM 809, CDROM, magnetic tape, and magnetic discs. Volatile media, i.e., media that cannot retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high-level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

FIG. 9 is a flow diagram that illustrates predicting pixel values within a coding block signaled in a video bitstream. The method may include receiving a video bitstream including at least one coding block at 902. At 904, if a second level intra prediction process is determined to have been combined with the first level prediction mode during encoding, at 908 a first level predictor for a pixel within the coding unit may be generated based on neighboring pixels and an intra prediction mode selected from sixty-seven intra prediction modes available in JVET, where the intra-prediction mode was selected during encoding of said pixel. the pixel in the at least one coding unit derived at 908 using the first level predictor generated based on the selected at least one intra prediction mode and a second level prediction process. If it is determined that a second level intra prediction mode was not combined with one of the selected 67 intra prediction modes, the decoding at 910 is based on the selected intra prediction mode without combination with a second level intra prediction process. At 912, a pixel value for pixels within the coding block may be determined using the first and second level predictions.

As disclosed above, determining whether a second level intra prediction process is combined with the first level intra prediction mode may be determined based on a list of constrained intra prediction modes that are excluded from combination with the PDPC mode; and/or a presence or absence of signaling in the video bitstream identifying whether PDPC mode is applicable.

Figure 10:
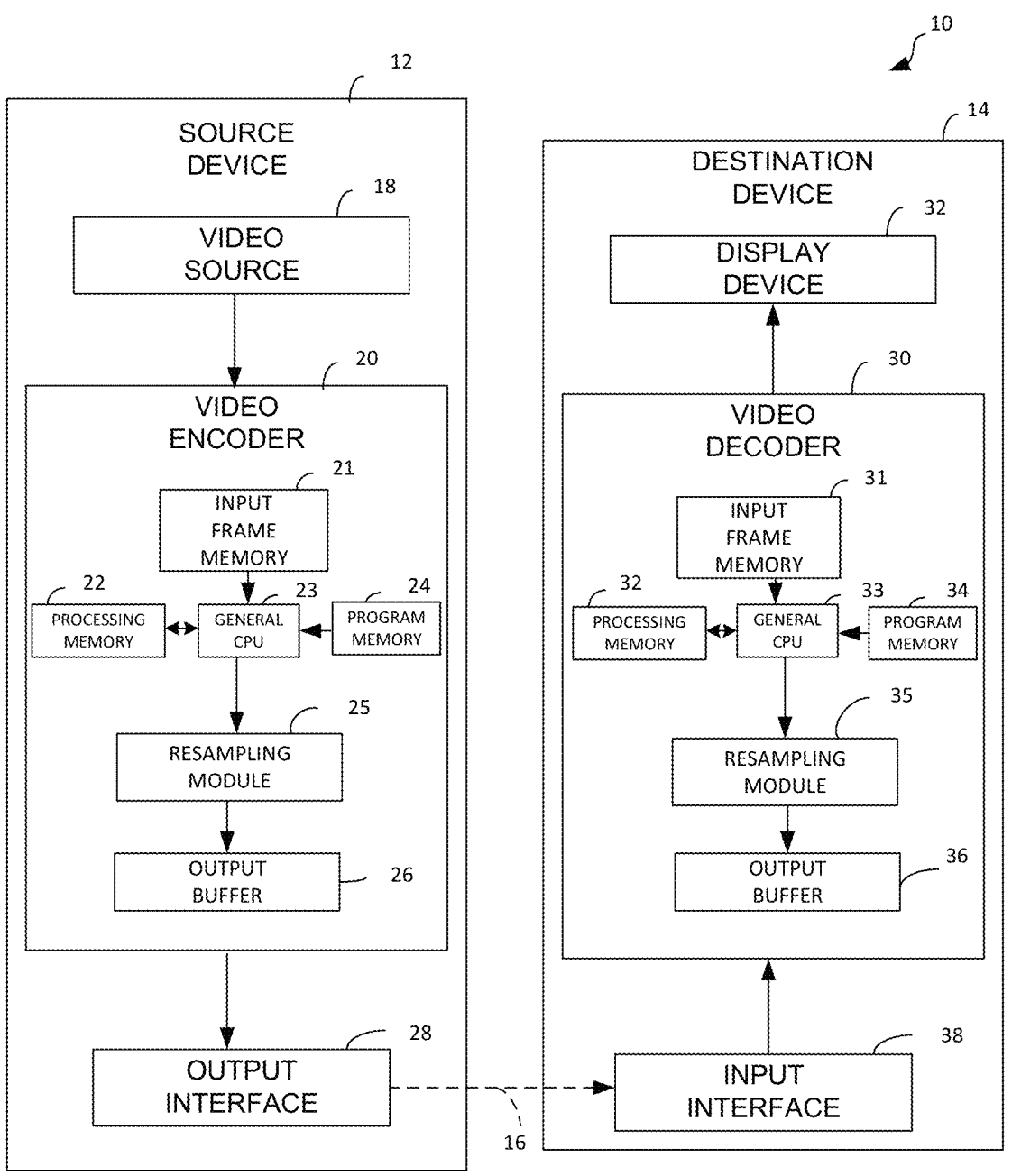
FIG. 10 is a high-level view of a source device and destination device that may incorporate features of the systems and devices described herein.

FIG. 10 is a high-level view of a source device 12 and destination device 10 that may incorporate features of the systems and devices described herein. As shown in FIG. 10, example video coding system 10 includes a source device 12 and a destination device 14 where, in this example, the source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 10, source device 12 includes a video source 18, video encoder 20, and an output interface 22. In some cases, output interface 28 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. An input image may be received by the video encoder 20 and stored in the input frame memory 21. The general-purpose processor 23 may load information from here and perform encoding. The program for driving the general-purpose processor may be loaded from a storage device, such as the example memory modules depicted in FIG. 10. The general-purpose processor may use processing memory 22 to perform the encoding, and the output of the encoding information by the general processor may be stored in a buffer, such as output buffer 26.

The video encoder 20 may include a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters.

The encoded video data, e.g., a coded bit stream, may be transmitted directly to destination device 14 via output interface 28 of source device 12. In the example of FIG. 10, destination device 14 includes an input interface 38, a video decoder 30, and a display device 32. In some cases, input interface 28 may include a receiver and/or a modem. Input interface 38 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

The encoded video data may also be stored onto a storage medium or a file server for later access by destination device 14 for decoding and/or playback. For example, the coded bitstream may be temporarily stored in the input buffer 31, then loaded in to the general-purpose processor 33. The program for driving the general-purpose processor may be loaded from a storage device or memory. The general-purpose processor may use a process memory 32 to perform the decoding. The video decoder 30 may also include a resampling module 35 like the resampling module 25 employed in the video encoder 20.

FIG. 10 depicts the resampling module 35 separately from the general-purpose processor 33, but it would be appreciated by one of skill in the art that the resampling function may be performed by a program executed by the general-purpose processor, and the processing in the video encoder may be accomplished using one or more processors. The decoded image(s) may be stored in the output frame buffer 36 and then sent out to the input interface 38.

Display device 38 may be integrated with or may be external to destination device 14. In some examples, destination device 14 may include an integrated display device and may also be configured to interface with an external display device. In other examples, destination device 14 may be a display device. In general, display device 38 displays the decoded video data to a user.

Video encoder 20 and video decoder 30 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally, or alternatively, video encoder 20 and video decoder 30 may operate according to other proprietary or industry standards that function with the disclosed JVET features. Thus, other standards such as the ITU-T 11.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 23 and 33 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 23 and 33.

A storage device may also store instructions, instructions, such as source code or binary code, for performing the techniques described above. A storage device may additionally store data used and manipulated by the computer processor. For example, a storage device in a video encoder 20 or a video decoder 30 may be a database that is accessed by computer system 23 or 33. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although the subject matter has been described in language specific to structural features and/or methodological acts, it is to be understood that the subject matter defined in the appended claims is not necessarily limited to the specific features or acts described above.

Although embodiments have been disclosed herein in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. An apparatus for decoding video data using a decoder comprising:

(a) receiving a bitstream indicating how a coding tree unit was partitioned into coding units according to a partitioning structure that allows nodes to be split according to a partitioning technique, where the partitioning technique allows a node to be partitioned with quadtree partitioning technique, where said partitioning technique allows nodes to be partitioned with binary partitioning that splits a node in half in either a horizontal direction or a vertical direction resulting in two blocks that together are the same size as child nodes;

(b) parsing said bitstream to generate at least one predictor based on an intra prediction mode signaled in the bitstream, the intra prediction mode selected from a plurality of intra prediction modes for calculating a prediction pixel $P[x,y]$ at coordinate x,y for the coding unit, where at least one of said coding units is rectangular;

(c) wherein the prediction pixel is calculated based upon a value where said value is determined based upon, a vertical pixel value being based upon at least one reconstructed pixel value of the next adjacent row above the coding unit, a horizontal pixel value being based upon at least one reconstructed pixel value of the next adjacent column left the coding unit, said vertical pixel value having an associated vertical weight, said horizontal pixel value having an associated horizontal weight, a summation of (i) said vertical pixel value multiplied by said vertical weight (ii) said horizontal pixel value multiplied by said horizontal weight, (iii) an adjustment value based upon said vertical weight and said horizontal weight, and a value based upon said summation shifted by a bit shift operation to the right;

(d) wherein the calculation is based upon reconstructed pixels of one or more above neighboring blocks and reconstructed pixels of one or more left neighboring blocks as the predictions for the pixels within the coding unit.

2. An apparatus for encoding video data in a bitstream using an encoder comprising:

(a) providing a bitstream indicating how a coding tree unit was partitioned into coding units according to a partitioning structure that allows nodes to be split according to a partitioning technique, where the partitioning technique allows a node to be partitioned with quadtree partitioning technique, where said partitioning technique allows nodes to be partitioned with binary partitioning that splits a node in half in either a horizontal direction or a vertical direction resulting in two blocks that together are the same size as child nodes;

(b) wherein said bitstream is configured for parsing to generate at least one predictor based on an intra prediction mode signaled in the bitstream, the intra prediction mode selected from a plurality of intra prediction modes for calculating a prediction pixel $P[x,y]$ at coordinate x,y for the coding unit, where at least one of said coding units is rectangular;

(c) wherein the prediction pixel is calculated based upon a value where said value is determined based upon, a vertical pixel value being based upon at least one reconstructed pixel value of the next adjacent row above the coding unit, a horizontal pixel value being based upon at least one reconstructed pixel value of the next adjacent column left the coding unit, said vertical pixel value having an associated vertical weight, said horizontal pixel value having an associated horizontal weight, a summation of (i) said vertical pixel value multiplied by said vertical weight (ii) said horizontal pixel value multiplied by said horizontal weight, (iii) an adjustment value based upon said vertical weight and said horizontal weight, and a value based upon said summation shifted by a bit shift operation to the right;

(d) wherein the calculation is based upon reconstructed pixels of one or more above neighboring blocks and reconstructed pixels of one or more left neighboring blocks as the predictions for the pixels within the coding unit.

3. A computer readable storage device storing a bitstream of compressed video data for decoding by a decoder, the bitstream comprising:

(a) said bitstream indicating how a coding tree unit was partitioned into coding units according to a partitioning structure that allows nodes to be split according to a partitioning technique, where the partitioning technique allows a node to be partitioned with quadtree partitioning technique, where said partitioning technique allows nodes to be partitioned with binary partitioning that splits a node in half in either a horizontal direction or a vertical direction resulting in two blocks that together are the same size as child nodes;

(b) said bitstream configured for parsing to generate at least one predictor based on an intra prediction mode signaled in the bitstream, the intra prediction mode selected from a plurality of intra prediction modes for calculating a prediction pixel P[x,y] at coordinate x,y for the coding unit, where at least one of said coding units is rectangular;

(c) wherein the prediction pixel is calculated based upon a value where said value is determined based upon, a vertical pixel value being based upon at least one reconstructed pixel value of the next adjacent row above the coding unit, a horizontal pixel value being based upon at least one reconstructed pixel value of the next adjacent column left the coding unit, said vertical pixel value having an associated vertical weight, said horizontal pixel value having an associated horizontal weight, a summation of (i) said vertical pixel value multiplied by said vertical weight (ii) said horizontal pixel value multiplied by said horizontal weight, (iii) an adjustment value based upon said vertical weight and said horizontal weight, and a value based upon said summation shifted by a bit shift operation to the right;

(d) wherein the calculation is based upon reconstructed pixels of one or more above neighboring blocks and reconstructed pixels of one or more left neighboring blocks as the predictions for the pixels within the coding unit.

* * * * *